United States Patent [19]

Yamawaki et al.

[11] Patent Number: 4,906,429
[45] Date of Patent: Mar. 6, 1990

[54] PROCESS FOR PRODUCING BLOWN FILM OF BUTENE-1 POLYMER

[75] Inventors: Takashi Yamawaki; Takeshi Yamada, both of Ichihara, Japan

[73] Assignees: Idemitsu Petrochemical Company Limited, Tokyo, Japan; Neste Oy, Espoo, Finland

[21] Appl. No.: 199,502

[22] Filed: May 27, 1988

[30] Foreign Application Priority Data

May 30, 1987 [JP] Japan .................. 62-136457

[51] Int. Cl.$^4$ .............................. B29C 47/20
[52] U.S. Cl. ..................... 264/564; 264/569; 425/326.1
[58] Field of Search ............... 264/564–569, 264/209.2; 425/326.1, 72.1

[56] References Cited

U.S. PATENT DOCUMENTS

| | | | |
|---|---|---|---|
| 3,551,540 | 12/1970 | Pellicciari | 264/569 |
| 3,576,051 | 4/1971 | Click et al. | 264/564 |
| 3,721,269 | 3/1973 | Choate et al. | 264/564 |
| 4,000,234 | 12/1976 | Pilgrim et al. | 264/569 |
| 4,176,148 | 11/1979 | Magder et al. | 264/41 |

FOREIGN PATENT DOCUMENTS

| | | | |
|---|---|---|---|
| 50-14741 | 2/1975 | Japan . | |
| 50-96671 | 7/1975 | Japan . | |
| 54-39859 | 11/1979 | Japan . | |
| 58-177324 | 10/1983 | Japan | 264/564 |

*Primary Examiner*—Jeffrey Thurlow
*Attorney, Agent, or Firm*—Armstrong, Nikaido Marmelstein Kubovcik & Murray

[57] ABSTRACT

This invention provides a process for producing a blown film of butene-1 polymer excellent in elasticity, elastic recovery, impact strength and the like which includes extruding a butene-1 polymer having a melt index of 0.3–10 g/10 min in a tubular form from extrusion die at an extrusion temperature of 120°–250° C. and then inflation molding the tubular film under the conditions that frost line height is 38–100 cm, stretch ratio in machine direction is 5 or more and ratio of stretch ratio in machine direction/stretch ratio in transverse direction is 2.5 or more.

8 Claims, 1 Drawing Sheet

PROCESS FOR PRODUCING BLOWN FILM OF BUTENE-1 POLYMER

BACKGROUND OF THE INVENTION (1) Field of the invention

This invention relates to a process for producing a blown film of butene-1 polymer. More particularly, it relates to a process for producing a blown film superior in elasticity, elastic recovery, impact strength and the like.

(2) Description of the Related Art

Recently, demand for improvement of properties of film of butene-1 has been increased.

Hitherto, a process for producing polybutene sheet superior in elasticity and elastic recovery has been known which comprises further heat-treating a stretched polybutene at a specific temperature. (See Japanese Patent Kokai No. 50-96671.)

However, this process is industrially disadvantageous because steps are complicated and troubles are apt to occur. Besides, the products are not satisfactory in elastic recovery. Therefore, there has been demanded a process for producing a polybutene sheet superior in elasticity and elastic recovery without heat treatment step.

A film comprising a blend of butene-1 copolymer, a low-density polyethylene and a polypropylene has been known. (See, Japanese Patent Kokoku No. 54-39859 and Japanese Patent Kokai No. 50-14741.) However, there has been no sufficient research on molding of a film comprising butene-1 polymer alone.

SUMMARY OF THE INVENTION

This invention has been made under the above circumstances. The object of this invention is to provide a process by which a butene-1 polymer film superior in elasticity and elastic recovery and mechanical strengths such as film impact strength can be obtained.

In order to accomplish the above object, the inventors have made intensive research in an attempt to produce butene-1 polymer films excellent in film properties such as elasticity and elastic recovery by ordinary inflation molding machines and as a result have found that the object of this invention can easily be attained by carrying out inflation molding under specific conditions, namely, a specific extrusion temperature, a specific frost line height, a specific stretch ratio in machine direction ($R_{MD}$) and a specific ratio of $R_{MD}/R_{TD}$ ($RTD$ means stretch ratio in transverse direction). This invention has been accomplished on the basis of this finding.

That is, the gist of this invention for attaining the above object if a process for producing a blown film of butene-1 polymer, characterized by tubular-extruding a butene-1 polymer having a melt index of 0.3–10 g/10 min from an extrusion die at a resin extrusion temperature of 120°–25° C. and inflation molding it under the conditions of 38–100 cm in frost line height, 5 or higher in stretch ratio in machine direction and 2.5 or higher in the ratio of stretch ratio in machine direction/stretch ratio in transverse direction.

DESCRIPTION OF THE PREFERABLE EMBODIMENT

Figure 1:
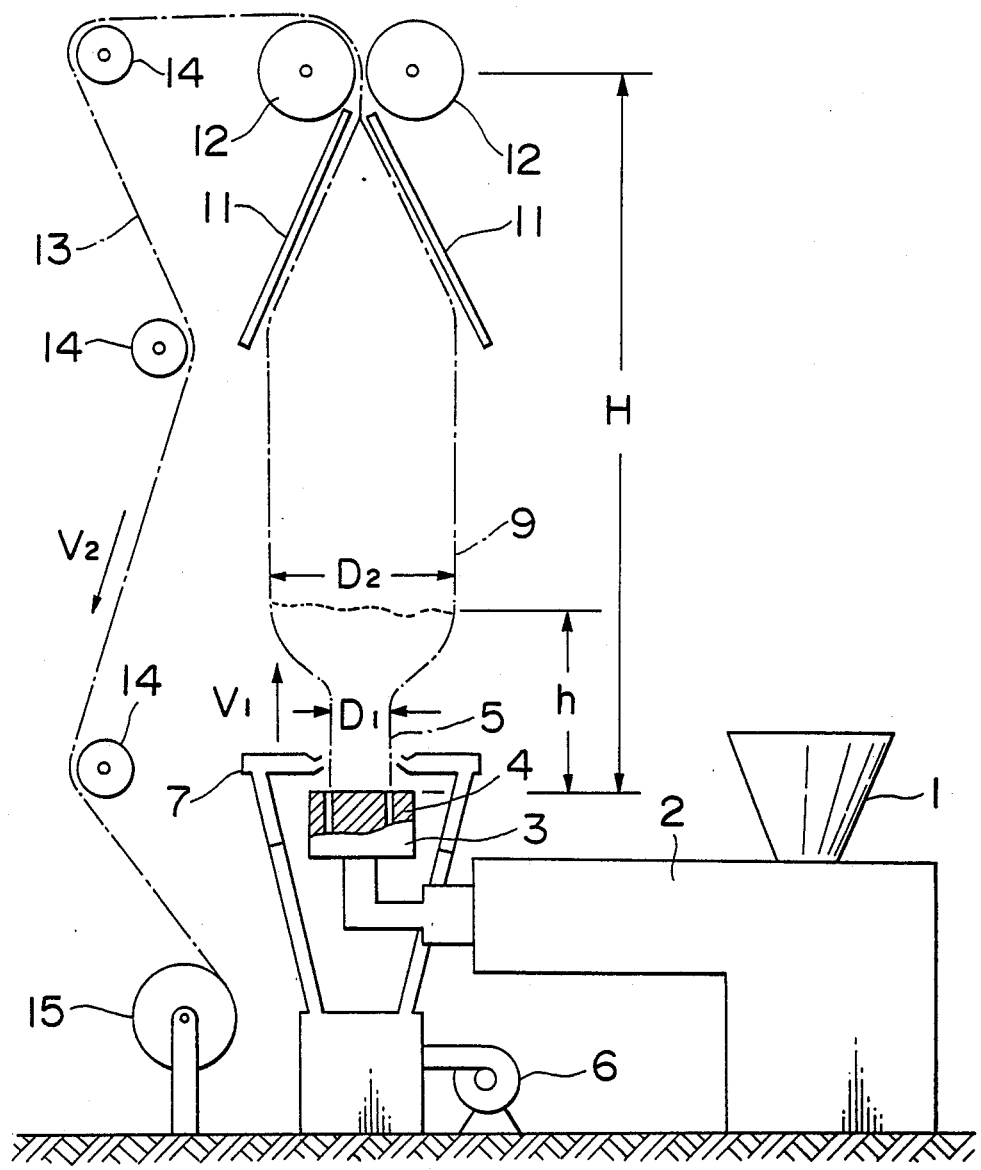
FIG. 1 shows one example of apparatus used for production of inflation film of butene-1 polymer according to the process of this invention and further shows one example of the production steps according to the process of this invention.

This invention will be explained in detail with reference to the drawing.

FIG. 1 shows outline of one exemplified apparatus and steps for practice of the present process for production of inflation film of butene-1 polymer.

In FIG. 1, resin introduced into extruder 2 from hopper 1 is extruded from ring slit of extrusion die 3 in molten state and in continuous manner so that a molten resin tubular body 5 is formed. Molten resin tubular body 5 is cooled from outside by air ring 7 provided at blower 6 and simultaneously is stretched in transverse and machine directions by internal pressure to form resin bubble 9.

The resin bubble 9 is led between a pair of nip rolls 12 by guide plate 11 and is flattened by nip rolls 12 to produce a flat cylindrical butene-1 polymer blown film 13. This film 13 is continuously wound up by wind-up machine 15 through a plurality of transfer rolls 14.

The molten resin extruded from extrusion die 3, namely, the resin used in the process of this invention is butene-1 polymer having a melt index of 0.3–10 g/10 min and this butene-1 polymer may be any of butene-1 homopolymer or copolymer containing not more than 30 mol % of other α-olefin unit such as ethylene, propylene or hexene-1 produced by known polymerization method such as vapor phase polymerization, bulk polymerization, slurry polymerization and the like or mixtures of these polymers. Furthermore, if necessary, polyethylene such as low density polyethylene, polypropylene or the like may be mixed therewith.

When melt index of butene-1 polymer used is less than 0.3 g/10 'min, molding becomes unstable and appearance of film becomes inferior. When more than 10 g/10 min, elastic recovery and mechanical strength of the resulting molded film decrease.

The butene-1 polymer used desirably has a density of normally 0.87–0.92 g/cm$^2$, especially preferably 0.88-0.91 g/cm$^2$.

The butene-1 polymer may contain various additives such as antioxidant, ultraviolet absorber and the like.

In the present process, extrusion temperature at film molding, namely, temperature of the part of ring slit 4 of extrusion die 3 is set 120°–250° C., preferably 140°–220° C.

When the extrusion temperature is lower than 120° C., molding becomes unstable and this causes breakage of bubble and when higher than 250° C., resin bubble becomes unstable, resulting in unevenness in film thickness.

In this invention, stretch ratio in machine direction ($R_{MD}$) at film molding is at least 5, preferably 6–20 and ratio of the stretch ratio in machine direction ($R_{MD}$) to stretch ratio in transverse direction ($R_{TD}$), namely, RMS/RTD is at least 2.5 preferably 3.0–10.

The stretch ratio in machine direction, i.e., $R_{MD}$ is expressed by the following formula (1):

$$R_{MD}=V_2/V_1 \qquad (1)$$

wherein $V_1$ is extrusion speed of molten resin tubular body 5 extruded from ring slit 4 and $V_2$ is winding-up speed at wind-up machine 15.

The stretch ratio in transverse direction, i.e., $R_{TD}$ is expressed by the formula (2):

$$R_{TD} = D_2/D_1 \qquad (2)$$

wherein $D_1$ is diameter of the portion of the tubular body at which inflation of molten resin tubular body 5 begins and $D_2$ is diameter of the inflated resin bubble 9.

When $R_{MD}$ is less than 5, elastic recovery of molded film is deteriorated and even when $R_{MD}$ is 5 or more, if $R_{MD}/R_{TD}$ is less than 2.5, elastic recovery of molded film is also deteriorated.

Wind-up speed $V_2$ at molding of film is preferably at least 7 m/min, especially preferably 8-30 m/min.

In the process of this invention, frost line height (cf. FIG. 1) at molding of film is set at 38-100 cm, preferably 40-80 cm.

When the frost line height is less than 38 cm, amount of cooling air becomes too much, causing periodic variation of resin bubble and when more than 100 cm, the resin bubble is apt to move in a zigzag direction to cause uneven film thickness.

Distance H from resin extrusion opening of extrusion die 3 to the center of nip roll 12 is desirably at least 3 m. When this distance H is less than 3 m, there may occur inferior release of resin film or inferior molding.

The resin films thus obtained are excellent in elasticity and elastic recovery and are also excellent in mechanical strengths such as impact strength and can be suitably used in various fields of resin films.

Since this invention uses a process for blown film molding of a butene-1 polymer having specific melt index under specific conditions, there is provided a process for producing an industrially excellent blown film of butene-1 polymer according to which a blown film of butene-1 polymer superior in elasticity and elastic recovery and furthermore in mechanical strength such as film impact strength can be stably and easily obtained.

EXAMPLES

Preparation Example 1 (production of butene-1 homopolymer) (1) Preparation of solid catalyst component (a):

Butyloctylmagnesium (20% heptane solution) was charged in a five necked flask provided with a mechanical stirrer, a reflux condenser, a gas feeding valve and a thermometer and the solid catalyst component was prepared in the following manner. That is, nitrogen was passed through the suspension to keep inert atmosphere. Butyl chloride was added through a dropping funnel at room temperature. Then, chlorine gas was introduced at 5 ml/min to carry out chlorination.

Then, silicone oil was added at 25°-35° C. and thereafter ethanol was added dropwise to the mixture. While adding ethanol, chlorinated precipitate settled as a thick layer. Then, the mixture was stirred at 40° C. for 1 hour. Thereafter, temperature was raised to 75°-80° C. and the resulting solution was left to stand overnight at this temperature.

This solution of high temperature was calmly added to an excess amount of TiCl$_4$ (−25° C.) cooled to low temperature and containing diisobutyl phthalate as an electron doner by siphone, thereby to precipitate reaction intermediate product in the low temperature TiCl$_4$. Then, temperature of the mixture was raised to room temperature. Then, diisobutyl phthalate as an electron doner was added thereto and temperature was raised to 100°-110° C. and the mixture was kept at this temperature for 1 hour. After settling of precipitate, this was washed 5-6 times with heptane of 85° C. and the solution was transferred to other solution by a siphon. Furthermore, an excess amount of TiCl$_4$ was added and the mixture was stirred at 110° C. for 1 hour. The precipitate was settled and solution was transferred by a siphon. The resulting catalyst component was washed with heptane several times (5-6 times at 80° C.) and dried under low vacuum. Thus, a solid catalyst component (a) of 6.0% by weight in Ti content was obtained.

(2) Preparation of catalyst

The solid catalyst component (a) obtained in the above (1) was diluted to 2 mmols Ti/liter and introduced into a catalyst preparation tank. To this catalyst preparation tank were fed 30 mmols/ liter of triisobutylaluminum and 12 mmols/liter of 1,8-cineole. Then, propylene was fed thereto in an amount of 50 g per 1 mmol of titanium. Temperature inside the catalyst preparation tank was raised to 40° C. and reaction for preparation of catalyst was allowed to proceed.

(3) Production of butene-1 homopolymer:

A fluidized bed type polymerizer of 300 mm in diameter and 100 liters in capacity was employed. A Ti catalyst slurry re-prepared in an amount of 3.6 mmols/liter in terms of Ti atom from the catalyst obtained in the above (2) was fed from the above catalyst preparation tank to said polymerizer at a flow rate of 0.15 liter/hr and besides triisobutylaluminum and 1,8-cineole were fed to the polymerizer (60° C.) at flow rates of 30 mmols/hr and 24 mmols/hr, respectively.

Partial pressure of butene-1 and that of nitrogen were adjusted to 3 kg/cm$^2$ and 4 kg/cm$^2$, respectively and butene-1, hydrogen gas and nitrogen gas were fed at a gas superficial velocity of 35 cm/sec. Discharging of polymer was controlled so that amount of polymer in the polymerizer became constant. Melt index of the resulting butene-1 homopolymer was 2.1 g/10 min and density was 0.910 g/cm$^3$.

Preparation Example 2 (Production of butene-1-ethylene copolymer)

A butene-1 - ethylene copolymer (ethylene content 2.2 mol %) was obtained in the same manner as in Preparation Example 1 except that butene-1 and ethylene were fed at the polymerization. This copolymer had a melt index of 1.0 g/10 min and a density of 0.902 g/cm$^3$.

EXAMPLES 1-7 AND COMPARATIVE EXAMPLES 1-7

Films of 400 mm in flat width were obtained by inflation molding under the conditions as shown in Table 1 using the following resins.

A: Butene-1 homopolymer
(Polybutene-1 manufactured by Shell Chemical Co.; tradename: 0200; melt index: 1.6 g/10 min and density: 0.907 g/cm$^3$)

B: Butene-1 - ethylene copolymer
(Polybutene-1 manufactured by Shell Chemical Co.; tradename: 1600 SA; ethylene content: 10.5 mol%; melt index: 0.92 g/ 10 min; density: 0.904 g/cm$^3$)

C: Butene-1 homopolymer
(This was one obtained in Preparation Example 1)

D: Butene-1 - ethylene copolymer (This was one obtained in Preparation Example 2) An extruder manufactured by Placo Co. was used under the conditions of diameter of die: 120 mm, clearance: 1.0 mm and extrusion amount: 30 kg/hr. Film thickness and elastic recovery of the resulting resin films were measured and the results are shown in Table 1.

Elastic recovery was determined as follows: A test film of 100 mm in machine direction and 10 mm in transverse direction was stretched in machine direction at a stretch rate of 100 mm/min so as to reach the stretch ratio as shown in Table 1 and increment in length (a mm) after stretching and decrement in length (b mm) due to shrinking after release of stress were measured. The elastic recovery was obtained from (b/a)×100.

TABLE 1

| | Resin | Extrusion Temperature °C. | h cm | $R_{MD}$ | $R_{MD}/R_{TD}$ | Wind-up rate m/min | H m | Thickness of film μm | Elastic Recovery (%) After stretching of 50% | After stretching of 75% | After stretching of 100% |
|---|---|---|---|---|---|---|---|---|---|---|---|
| Example 1 | A | 180 | 45 | 12.7 | 6.0 | 22.6 | 4.0 | 30 | 90 | 90 | 89 |
| Example 2 | A | 180 | 45 | 7.1 | 3.4 | 12.6 | 4.0 | 55 | 87 | 85 | 84 |
| Comparative Example 1 | A | 180 | 45 | 3.8 | 1.8 | 6.8 | 4.0 | 100 | 77 | 73 | 68 |
| Comparative Example 2 | A | 280 | 45 | 12.7 | 6.0 | 22.6 | 4.0 | Great Unevenness in thickness | — | — | — |
| Comparative Example 3 | A | 180 | 35 | 12.7 | 6.0 | 22.6 | 4.0 | Great Unevenness in thickness | — | — | — |
| Comparative Example 4 | A | 180 | 150 | 12.7 | 6.0 | 22.6 | 4.0 | Great Unevenness in thickness | — | — | — |
| Comparative Example 5 | A | 180 | 45 | 12.7 | 6.0 | 22.6 | 1.8 | Sticking to roll occurred and molding was impossible | — | — | — |
| Example 3 | B | 180 | 45 | 12.7 | 6.0 | 22.6 | 4.0 | 30 | 89 | 88 | 86 |
| Example 4 | B | 140 | 45 | 12.7 | 6.0 | 22.6 | 4.0 | 30 | 92 | 92 | 90 |
| Example 5 | B | 210 | 45 | 12.7 | 6.0 | 22.6 | 4.0 | 30 | 89 | 88 | 87 |
| Comparative Example 6 | B | 180 | 45 | 3.8 | 1.8 | 6.8 | 4.0 | 100 | 70 | 67 | 62 |
| Comparative Example 7 | B | 180 | 45 | 2.9 | 1.4 | 5.2 | 4.0 | 130 | 56 | 47 | 38 |
| Example 6 | C | 180 | 45 | 12.7 | 6.0 | 22.6 | 4.0 | 30 | 92 | 91 | 90 |
| Example 7 | D | 180 | 35 | 12.7 | 6.0 | 22.6 | 4.0 | 30 | 90 | 90 | 89 |

What is claimed is:

1. A process for producing a blown film of butene-1 polymer which comprises extruding a butene-1 polymer having a melt index of 0.3–10 g/10 min in a tubular form from an extrusion die at an extrusion temperature of 120°–250° C. and then inflation molding the tubular film under the conditions that frost line height is 38–100 cm, stretch ratio in machine direction is 6–20, stretch ratio in transverse direction is about 2.1, and ration of stretch ratio in machine direction/stretch ratio in transverse direction is 3.0–10.0.

2. A process according to claim 1 wherein distance between extrusion die and nip rolls is 3 m or more.

3. A Process according to claim 1 or 2 wherein wind-up rate is 7 m/min or more.

4. A process according to claim 1 wherein the butene-1 polymer is at least one polymer selected from the group consisting of a butene-1 homopolymer, a copolymer of butene-1 and α-olefin other than butene-1, a mixture of butene-1 homopolymer and polyethylene and a mixture of said copolymer and polyethylene.

5. A process according to claim 4 wherein the copolymer contains 30 mol % or less of α-olefin unit.

6. A process according to claim 1 wherein the butene-1 polymer is at least one polymer selected from the group consisting of a butene-1 homopolymer and a copolymer of butene-1 and ethylene.

7. A process according to claim 6 wherein the copolymer contains 30 mol % or less of ethylene unit.

8. A process according to claim 1 wherein the butene-1 polymer has a density of 0.87–0.92 g/cm³.

* * * * *